United States Patent [19]

Glynn

[11] Patent Number: 5,424,862
[45] Date of Patent: Jun. 13, 1995

[54] HIGH CAPACITY COMMUNICATIONS SATELLITE

[76] Inventor: Thomas W. Glynn, 1806 Severn Grove Rd., Annapolis, Md. 21401

[21] Appl. No.: 234,400

[22] Filed: Apr. 28, 1994

[51] Int. Cl.⁶ .................................... H04B 10/00
[52] U.S. Cl. .................................... 359/172; 359/113; 359/117; 455/12.1; 385/17; 342/352
[58] Field of Search ............ 359/172, 109, 113, 117, 359/152, 157; 455/12.1, 13.3; 385/17; 342/352; 370/24

[56] References Cited

U.S. PATENT DOCUMENTS 5,017,925  5/1991  Bertiger et al. ............... 342/352
5,161,248  11/1992  Bertiger et al. ............... 342/352

FOREIGN PATENT DOCUMENTS 0165043  12/1980  Japan ............................. 359/172
0165044  12/1980  Japan ............................. 359/172

Primary Examiner—David K. Moore
Assistant Examiner—Kinfe-Michael Negash
Attorney, Agent, or Firm—Sughrue, Mion, Zinn, Macpeak & Seas

[57] ABSTRACT

A high capacity communication satellite uses a large number of parallel beams and optical processing to effect a fully interactive, high bandwidth, high channel capacity fully switched communication system. The satellite reuses its assigned bandwidth in each of the multiple beams. The beams are formed by either RF or optical means. The specific users in each beam are then separated optically using spatial light modulation (SLM) array correlation techniques. A single large SLM, or multiple smaller SLMs in combination, may be used. The individual customers are then repositioned in the array by optical SLM mixing and recorrelation. The result is then remodulated by another SLM array used as a mixer, and then recombined to reform the appropriate outgoing beams. The entire system then becomes a fully switched, high bandwidth, high channel capacity communications network on a single satellite.

31 Claims, 5 Drawing Sheets

HIGH CAPACITY COMMUNICATIONS SATELLITE

BACKGROUND OF THE INVENTION

1. Field of the Invention

The present invention relates to communication satellites, and in particular, to the provision of a high bandwidth, high channel capacity, fully switched, fully interactive communication network in a single satellite. The inventive system is a high capacity communications satellite, or HCCS.

2. Description of the Related Art

Satellites have been used for communication for years. One common use of satellites involves distributed transmission, like the C and Ku band TeleSat, direct broadcast satellites which have one or two beams. These satellites, which are in geosynchronous orbit (i.e. their orbital speed and altitude are such that they seem to hover over a particular position on the earth's surface,) broadcast a series of simultaneous "programs" in one direction to a large number of individual ground stations. These are not point to point or interactive (2-way) satellites. However, they do have a fairly wide bandwidth (typically 100–500 MHz).

Another use for communications satellites is a so-called point to point gateway type use, in which a receiving beam is pointed at a large sending dish (for example, in Europe) and a corresponding transmitting beam is pointed at a receiving dish in the U.S. (for example, Intelsat). This system also is geosynchronous and wideband (100–500 MHz), but has a limited number of beams (for example, eight beams would be a large number for such a system). Also, these systems cover only limited areas, allow only limited switching, if any, and handle very few communication channels.

Some newer system designs (Iridium, Ellipsat, Calling Communications) involve a large number (66 to 840) of low orbit satellites that pass messages among themselves to create a fully interactive network. These are very complex, expensive systems limited to low bandwidth ($\approx$ 10 KHz or less) and low capacity (50–200 channels in the overall system).

Typical satellite communication systems have been limited by low bandwidth (e.g. 50–500 MHz would handle only 50–500 channels); switching networks, using standard video switching capable of inclusion in a satellite, would handle only 10–100 switched channels. Even the present nationwide telephone system handles only audio, which has a much lower bandwidth ($\approx$ 10 KHz), to switch about one million customers simultaneously. The ground telephone system contains 10,000–20,000 switching buildings, at a cost of over $100 billion.

It would be desirable to provide a satellite system having a large number of channels and high bandwidth, while providing a fully switched, interactive system. While optical-based spatial light modulator (SLM) technology is known, and can be used for transmission through the air, as evidenced for example in copending Appln. No. 08/133,879, filed in the name of the present inventor, the application of SLM technology to provide high capacity satellite communications has not been known, so far as the present inventor is aware.

SUMMARY OF THE INVENTION

It is an object of the present invention to create a communication satellite which does not suffer from the above drawbacks.

It is a specific object of the invention to provide a system which combines large number of multiple antenna beams and a novel optical processing and switching system utilizing SLM technology.

By utilizing a large number of parallel beams (100 to 4,000) and spatial light modulator (SLM) based optical processing to distinguish customers within each beam (100 to 1,000 customers/beam) and shift the individual customers to the appropriate output beam and output frequency, the present invention allows simultaneous switching of up to one million simultaneous 1 MHz (full video) signals, thus yielding a fully interactive video network.

The bandwidth achieved by the invention is 100 times the bandwidth of the expensive low earth orbit systems, and handles five to 20 times the number of simultaneous customers in a single satellite, in contrast to the 66 to 840 satellites required at present. As a result, the inventive system is relatively quite low in cost. The SLMs and beamforming devices are fairly inexpensive single integrated circuits, enabling a reduction in satellite weight to be less than half of that of present satellite designs.

The HCCS system uses from 100–4,000 simultaneous beams (the baseline design being 1,000). Since it is possible to reuse the full spectrum in each beam if the beams are coded properly, it is possible to handle 500 customers per beam (1 MHz/channel in a total bandwidth of 500 MHz), enabling total simultaneous usage by about 1 million customers.

The remaining problem is how to switch the 500,000 outgoing channels. As mentioned above, the present phone system requires 10,000–20,000 buildings to switch the same number of much lower-bandwidth audio channels; moreover, the HCCS system must switch the same number of much higher-bandwidth (1 MHz) video channels within a fairly small satellite.

Recent developments in SLM using quantum well technology have created the capability of 1024×1024 pixel arrays that can be driven at 1 GHz rates from full reflectance to almost zero reflectance (over 40 dB dynamic range). While arrays of this size would enable full implementation of the invention, and would be a preferred embodiment, as a practical matter at present only smaller SLMs are available in the necessary quantities and costs. It is within the contemplation of the invention to use a larger number of smaller SLMs (perhaps two, four, eight, or 16 or more as desired or necessary) in combination to provide performance comparable to that achieved by the larger SLMs.

In accordance with a preferred embodiment of the inventive switching technique, first the 500 channels per beam are encoded by either frequency assignment or broadband coding. Then, a 1024×1024 SLM array (made up of either a single SLM or multiple smaller SLMs) mixes the incoming frequencies from the assigned frequencies to baseband where they are detected and bandpassed. Alternatively, in the broadband coded case, the decoding signals are multiplied by the input and are integrated to separate the 500 channels per beam. Once separated and detected, they are remodulated by another set of SLMs to either move them to the appropriate beam or create the appropriate wide bandwidth per output beam to retransmit the information. The entire system takes approximately seven to 10 1024×1024 SLM arrays, a few detector arrays, and a few linear (1024×1) arrays with appropriate optics.

Additional optics to redirect a portion of each beam back to its same area can also be added to handle the expected higher volume of local calls.

It also is within the contemplation of the invention to add special circuitry as necessary to break some channels down further into over 100 audio channels, or to combine a number of channels for high definition television (HDTV) transmission.

BRIEF DESCRIPTION OF THE DRAWINGS

The features and advantages of the present invention will become more apparent from the detailed description set forth below when taken in conjunction with the drawings in which like reference characters correspond throughout, and wherein.

DETAILED DESCRIPTION OF THE PREFERRED EMBODIMENTS

Figure 1:
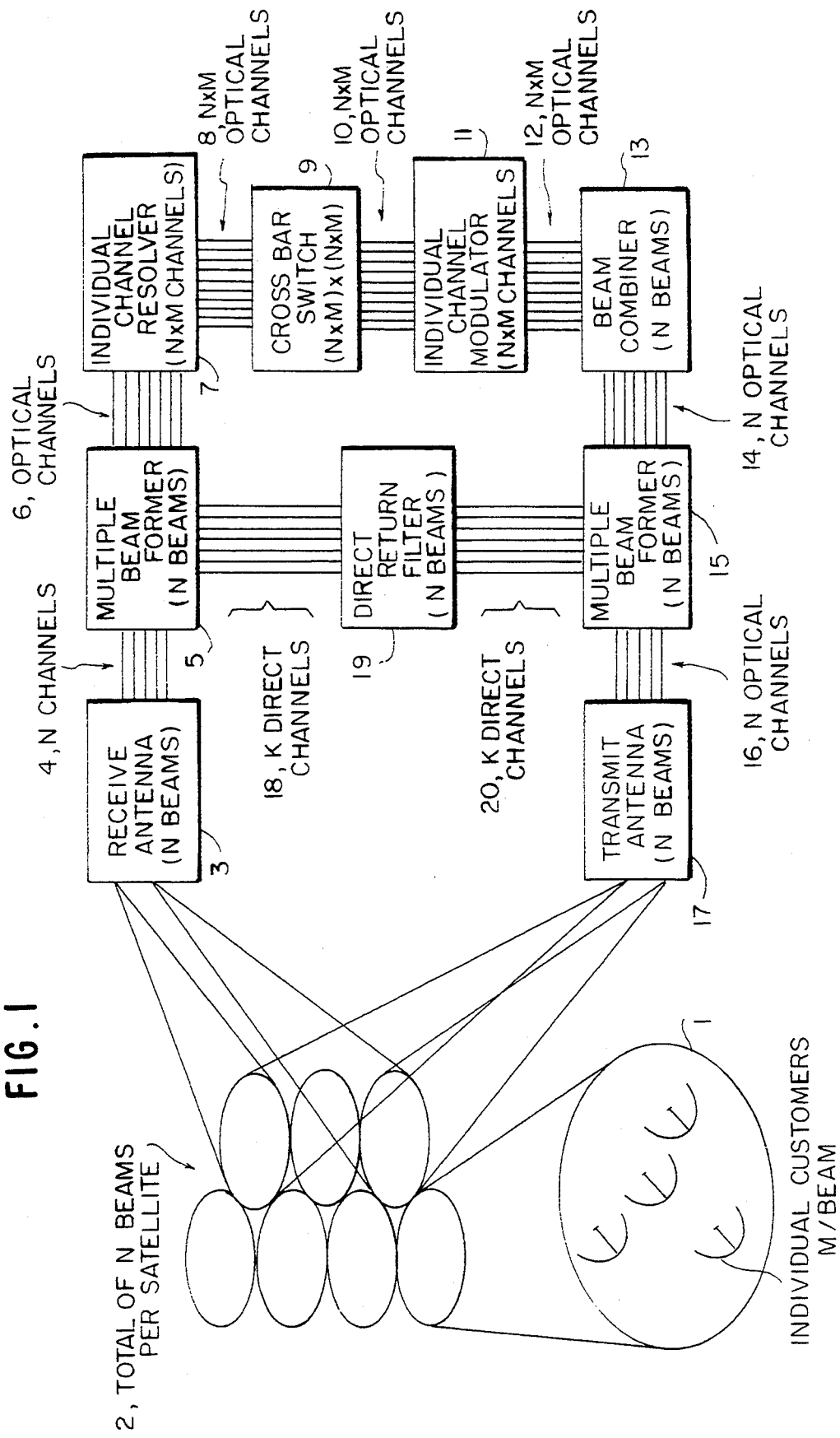
FIG. 1 is an overview of one embodiment of the invention used as a single communication satellite system.

FIG. 1 depicts a high capacity communications satellite system in accordance with the present invention, in which N beams 2, with M simultaneous customers 1 per beam, are shown. These M customers would be only a small fraction of the total customers in the beam. However, since only approximately 1% of the customers utilize a two-way communication system at any one time, these M simultaneous users could represent as many as 100×M potential customers or terminals, each having a small antenna, a transceiver, and a video camera and TV player.

The M simultaneous users (where M is from 100 to 4,000; typically 500) would have some low level of near-lossless video compression to compress each signal to a 1 MHz band (or digital equivalent), for a total of 500 signals in a typical implementation. These 500 signals, each having a bandwidth of 1 MHz, are either frequency coded or digitally coded to discriminate them from each other. The signals are received by one of the N parallel receive beams 3 (typically N=1000) created by the multiple beam antenna receiving system on a geosynchronous satellite (not shown).

On the satellite, the 1000 beams 3 (each containing 500 simultaneous users) are transmitted along N channels 4 to a multiple beamformer 5, using a 1×N SLM illuminated by a laser to form M optical channels 6. Each optical channel 6 is then spread in one dimension using a diverging cylindrical lens to illuminate a N×M SLM array in an individual channel resolver 7. The N×M SLM array is driven by appropriate sinusoidal signals on its backplane in order to downconvert the desired individual channels to video. After appropriate detection and filtering, each channel of each beam is effectively decoded and its signal is isolated on one pixel of the N×M detector array, yielding N×M optical channels 8.

An effective cross bar switch 9 is then applied to switch any individual channel to any desired output location. In its simplest embodiment, this would be done by encoding the signal at its source, on the ground to ensure that once detected, it will be in the desired column to be sent to the desired receive location. This would require no "intelligence" on the part of the satellite, and no changes in the satellite's operation.

In a slightly more complex implementation, a "double hop" capability would be added, in which transceivers on the ground in selected (or in all) beams could receive a signal and re-route it to the desired end points. This allows for alternative routing, when needed.

In a more general embodiment, selected pixels would be "remodulated" with arbitrary frequencies (or codes), the downconverting and detection process being repeated in either plane. The signal on any pixel could be moved to any other pixel, to permit fully random cross bar coupling.

Once the signals have been decoded and detected, they are used to modulate another N×M SLM to create N×M optical signal paths 10. These are then provided to an individual channel modulator 11, which includes another N×M SLM whose backplane contains appropriate sinusoidal or code modulation to "fill" the bandwidth of the retransmitted beams. The signals output over the N×M optical channels 12 then are provided to a beam combiner 13 which includes a 1×N detector array and cylindrical optics, yielding N optical channels 14. Then, a multiple beamformer 15 is used to create the appropriate signals 16 to create in turn N retransmitted beams 17 which are coaxial with the N received beams. These beams (typically 1000) contain the 500 channels each completing the cross linking of full video, simultaneous communication of one million customers.

An additional path is created from multiple beamformer 5 by subdividing K direct channels 18. This is done most easily if the channels are frequency encoded by a simple filter 19, such as a direct return filter, on each beam. The filtered channels are added along K direct channels 20 to multiple beamformer 15 to permit a large number of local video connections within each local beam.

Figure 2B:
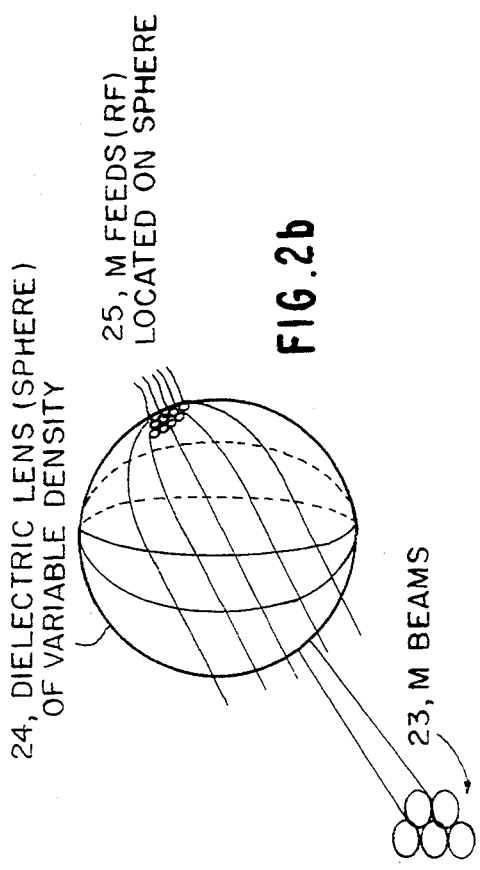
FIGS. 2A through 2C are more detailed views of a series of techniques for creating a multiple beam antenna design in accordance with the invention.
Figure 2A:
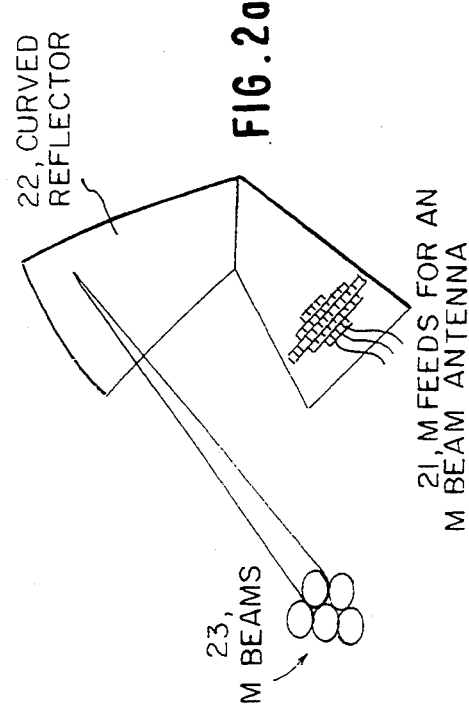
Figure 2C:
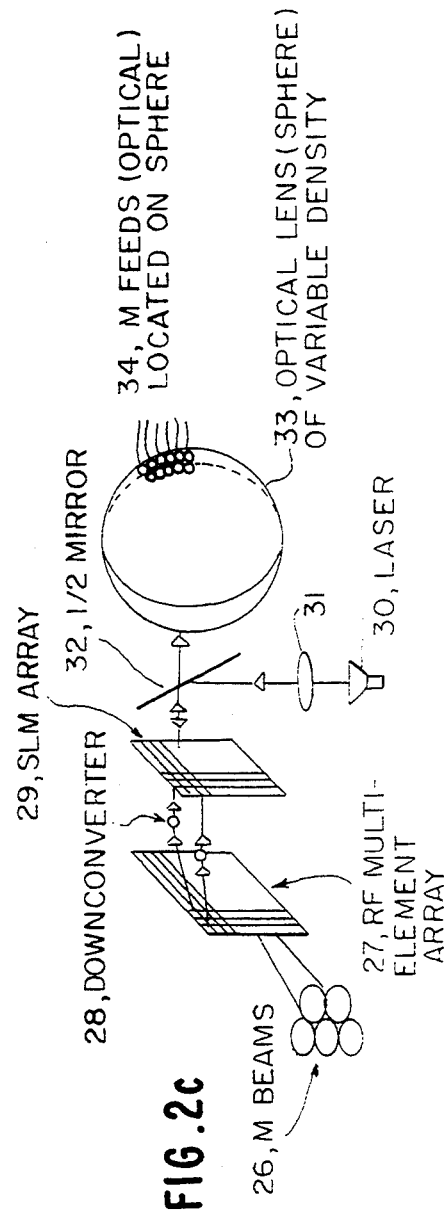

FIGS. 2A–2C show different methods of creating the "multiple antenna beams". FIG. 2A shows a standard multiple feed curved reflector design, commonly called a Gregorian fed multiple beam antenna. In that antenna, a series of actual RF feeds 21 are located at the focal plane of a curved reflector 22 so as to create a series of beams 23 that would cover a large area (like the U.S.) FIG. 2B shows an RF Luneburg lens, a technique that utilizes a dielectric sphere 24 that has a variable dielectric constant as a function of radius so as to focus any parallel rays to a point on the far side of the sphere. If M feeds were located on the appropriate locations 25, M beams 23 covering the desired area would be created.

The above two techniques are well known to ordinarily skilled artisans in this technological field, and so need not be detailed any further here. However, these techniques do tend to be cumbersome when employed in a satellite system. A more volume efficient design is shown in FIG. 2C, which shows a Luneburg optical lens approach, in which M incoming beams 26 are sampled by an RF multi-element array 27 of appropriate element number and spacing to create M beams, whose elements are connected in a pixel to array element manner to an N×M SLM 29. Prior to output to SLM 29, the output of array 27 is downconverted from RF to baseband in downconverter 28. A laser 30 illuminates the SLM 29 via appropriate cylindrical optics 31 and a half-mirror 32, and the output beam is focused onto the appropriate M detectors using a variable dielectric sphere 33 to sample the M beams. M feeds 34 (which can be diode lasers) are collocated to create the outgoing beams. As can be appreciated, the FIG. 2C embodiment would be quite a bit smaller than those of FIGS. 2A or 2B.

Figure 3:
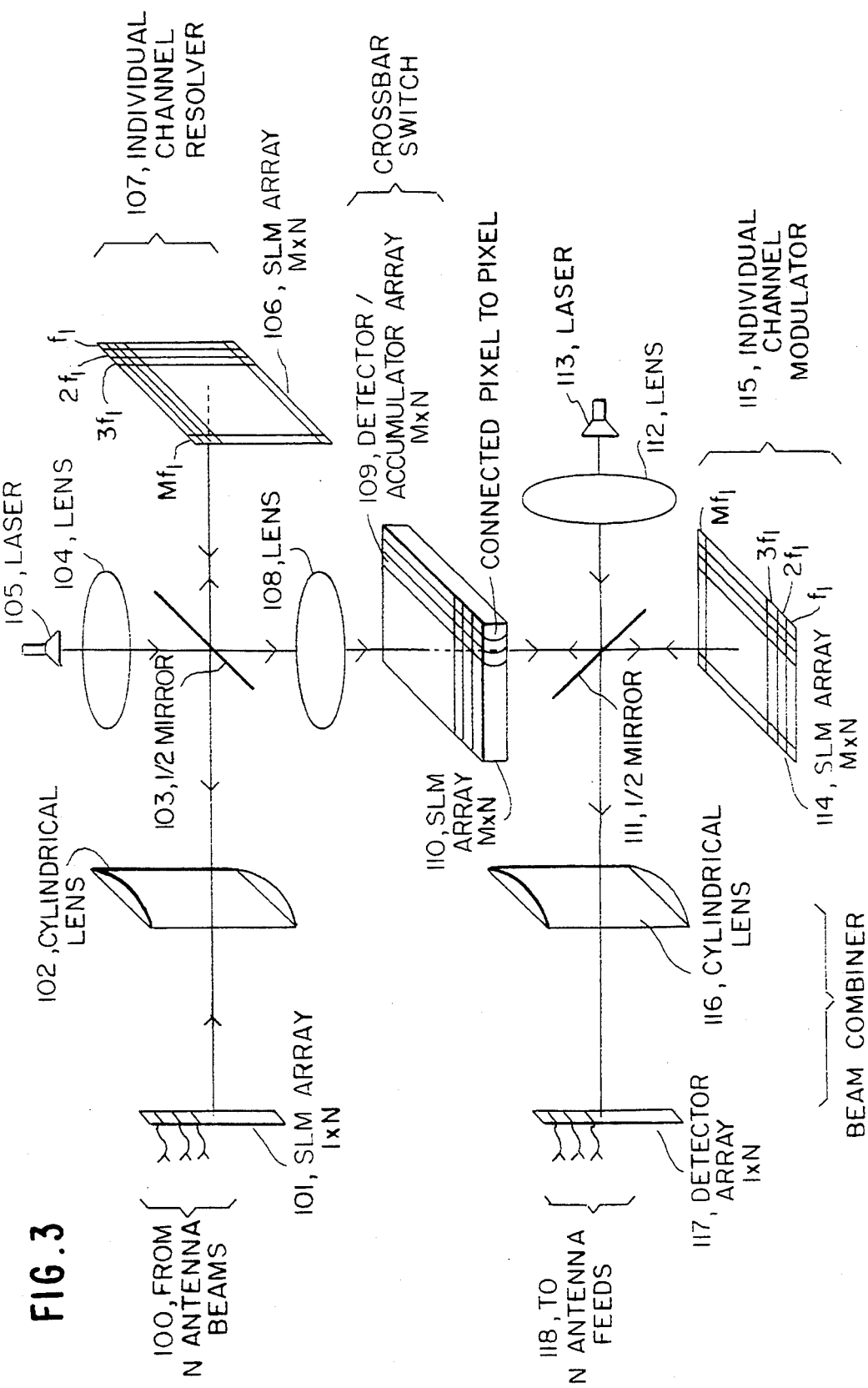
FIG. 3 is a more detailed view of the structure for performing optical processing in the first embodiment of the invention.

FIG. 3 describes the internal processing from the output 6 of the incoming beamformer 5 (N optical channels), through the input 14 of the outgoing beamformer 15 (N optical channels) as shown in FIG. 1. Referring to FIG. 3, the signals from the incoming beamformer 5 are constituted by N antenna beam signals on separate signal paths 100 (typically 1000 paths) each containing M frequency or digital coded simultaneous signals (typically M=500). These signal paths are connected to a 1×N SLM array 101. The array is illuminated by a laser 105 through a collimating lens 104 and a half mirror 103, the output of the laser 105 then being focused onto the line array 101 by a cylindrical lens 102. The lens 102 also spreads each combined beam reflected signal to cover a complete row of another SLM array 106. This array has each column hardwired together and modulated by the same signal within individual channel resolver 107. The first column is modulated by a frequency $f_1$, the second by a frequency $2f_1$, the third by a frequency $3f_1$, etc. until the last column is modulated by a frequency $Mf_1$. Thus the beam, which contains all frequencies from $f_1$ to $Mf_1$, is then multiplied by the reflectance of each pixel which also is modulated by $f_1$ to $Mf_1$ according to its position in the row. (The foregoing procedure actually is carried out in in-phase (I) and quadrature (Q) steps to cover both dimensions.) Thus the frequency effectively is "shifted" such that the desired channel is shifted or down converted to video. The array of signals is then bounced off half mirror 103 and focused by the collimating lens 108 onto detector/accumulator array 109. This procedure effectively detects the signal and low pass filters the desired signal for each pixel.

The detector/accumulator array 109 is connected on a pixel by pixel basis to another SLM array 110 which is illuminated by laser 113 through collimating lens 112 and half mirror 111. At this point, each individual channel has been fully detected and its signal located on one of the N×M pixels of the SLM array 110. The image then is reflected off SLM array 114 which "remodulates" the individual signals to "fill" the outgoing beams. At this point, the incoming N beams are still spread across the rows where beam 1 is row 1, beam 2 is row 2, etc. The columns now represent the individual customers inside the beam, column 1 representing customer 1, column 2 representing customer 2, etc. Individual channel modulator SLM 115, which in this embodiment is identical to SLM array 106 but rotated by 90°, takes this demodulated array and remodulates the signal corresponding to customer 1, beam 1 to frequency $f_1$; customer 1, beam 2 to frequency $2f_1$, etc. As with SLM array 106, the procedure is carried out in in-phase (I) and quadrature (Q) steps. Then, after the signals are reflected off the half mirror 111, they are compressed by cylindrical lens 116 into a single pixel which becomes outgoing beam 1. Each of the beams would be compressed in this manner, and the beams would be output via 1×N detector array 117 to the N antenna feeds 118. This is possible since the remodulation has the effect of modulating each "customer 1" with a different frequency, allowing receiving customers to differentiate their respective calls.

Thus, each customer J from all N beams is remodulated so as to be separated in frequency and combined optically to create a new output beam J.

For 1000 simultaneous customers per beam, and 1000 beams, this just-described embodiment would allow one customer from each beam to call customers in each of the other beams. Though the system's capability obviously would be quite large (1 million simultaneous video circuits), it would not match typical communication usage very well. This is because typically, a large number of calls are local and non-local calls, and tend to cluster into high density areas (e.g., New York City, Washington D.C.)

One technique to alleviate the call density problem would be to place repeaters in a large number of suspected under-utilized regions. These repeaters could use beam K as a stopover between the original point and the desired destination. While this approach would use up some of the capacity of area K served by beam K, it also would provide significant system flexibility.

Figure 4A:
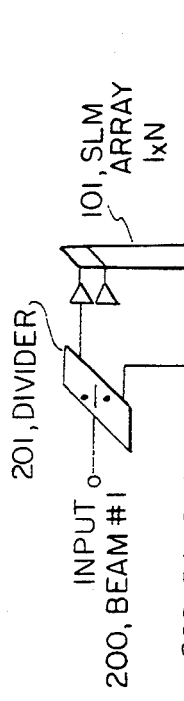
FIGS. 4A and 4B describes a mechanism for retransmitting a portion of the bandwidth of each beam back to the same area.
Figure 4B:
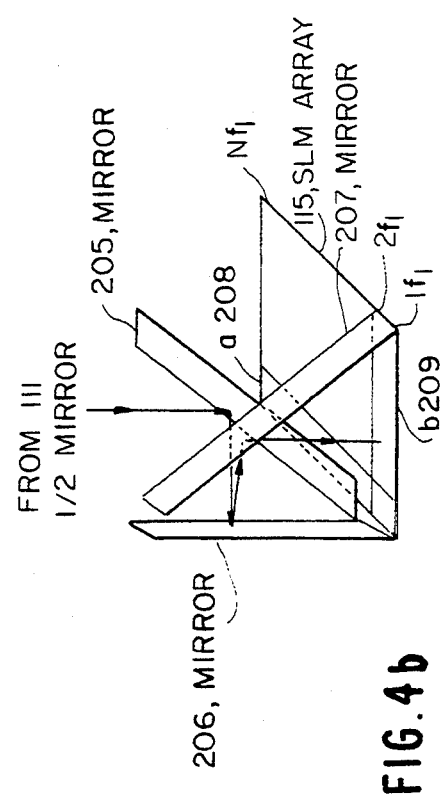

FIGS. 4A and 4B describe two mechanisms for increasing the available number of local (i.e. within beam) calls by dedicating frequencies $f_1$ to $f_k$ as "local" calls. This can be done on a beam-to-beam basis by direct filtering—a technique which will be described with reference to FIG. 4A—or by filtering all $f_1$ to $f_k$ signals after they have been filtered spatially—a technique which will be described with reference to FIG. 4B. FIG. 4A describes an electronic (signal filter bypass) solution, while FIG. 4B describes an optical solution, involving an optical alteration of N×M array 115 to accomplish a partial bandwidth bypass. In FIG. 4A, an incoming signal 200 is divided into two signals by divider 201. One of the signals continues onto the 1×N SLM array 101 for processing as described before. The other channel is filtered in bandpass filter 202 and combined directly with the output signal coming from the 1×N detector array 117. These signals are summed in summer 203 to provide a summed signal, which is used to drive the output beam 204 corresponding to the same input beam.

FIG. 4B describes an optical solution to the same problem. The signal coming through half mirror 111 is partially interrupted by a full mirror 205 oriented at 45° which reflects off the vertical mirror 206 and another 45° mirror 207 to image what is in region a to region b. Note that region b is rotated by 90° with respect to region a. After appropriate modulation, the output beam contains frequencies $f_1$ to $f_k$ that are identical to the frequencies $f_1$ to $f_k$ sent up in the same beam.

Figure 5:
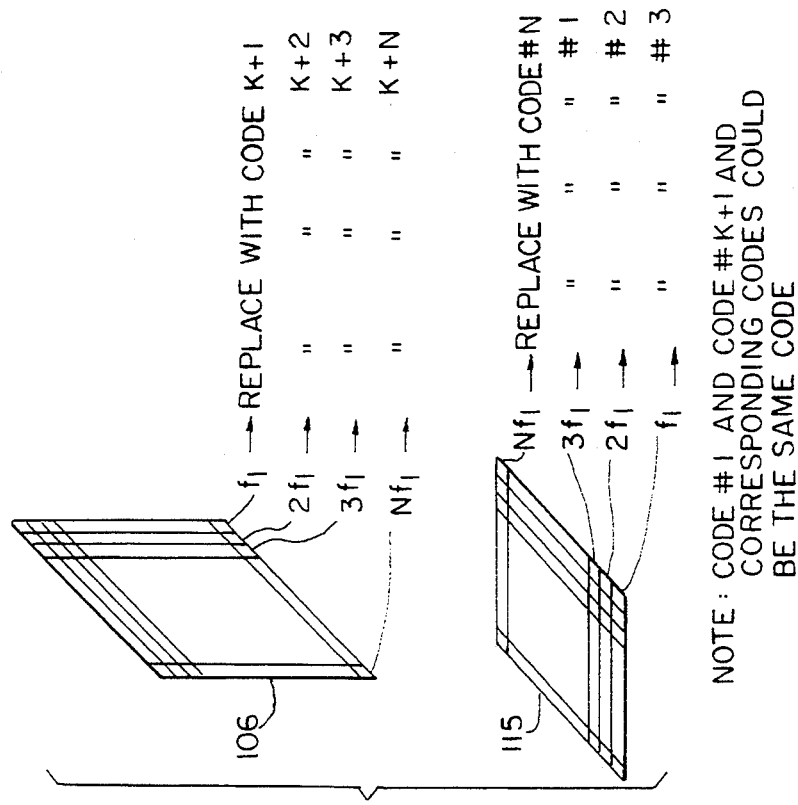
FIG. 5 describes an alternative embodiment using digital coding instead of frequency coding.

FIG. 5 describes an alterative embodiment that replaces the downconversion SLM 106 and the remodulation SLM 115 with digital code multiplication. The nomenclature used in this Figure indicates that different codes can be used in communicating in the two directions. As shown, frequency $f_1$ is replaced with code $K+1$, frequency $f_2$ is replaced with code $K+2$, and so on for the downconversion process, and frequency $f_1$ is replaced with code 3, frequency $f_2$ is replaced with code 2, and so on for the remodulation process. The reflective signal is then integrated to decode the desired signals. This technique will allow for many more channels to be contained in a given bandwidth, as is conventional in code division multiple access (CDMA) systems.

The simplest embodiment, even with the inbeam repeaters and the Partial Bandwidth Bypass to increase the available local calls, would have difficulty handling a large number of calls between two separate beams. Using the repeater technique uses up one additional channel per extra call. Thus, for example, 10 calls between Beam 10 (Los Angeles) and Beam 342 (Washington, D.C.) would take 19 total channels. A fully arbitrary cross bar switch, an embodiment of which is shown in FIG. 6, would handle that problem easily.

Figure 6:
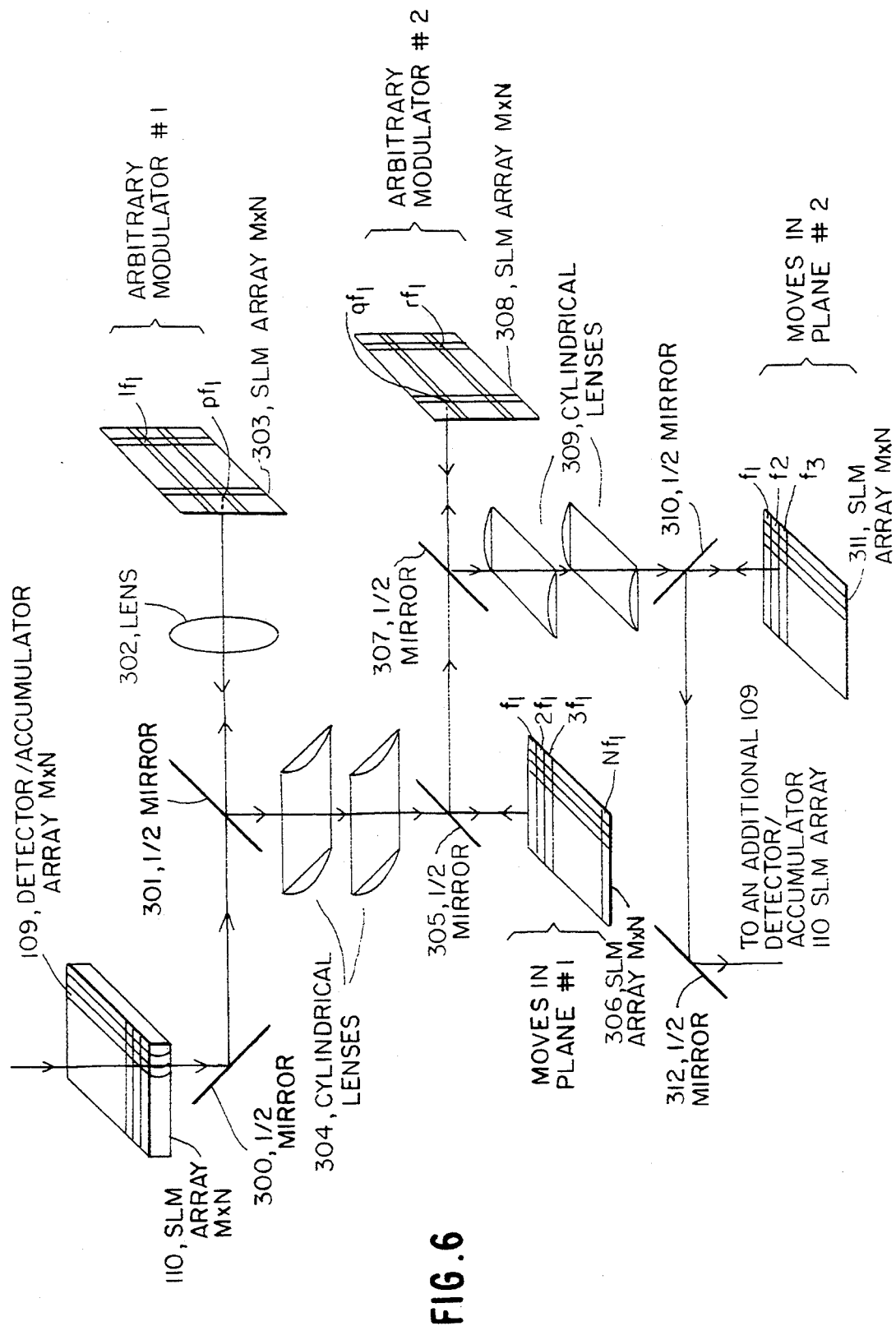
FIG. 6 is a detailed description of an "arbitrary" cross bar switch implementation in accordance with a second embodiment of the invention.

The arbitrary cross bar switch implementation of FIG. 6 includes all of the structure of FIG. 3, but adds optical elements between $N \times M$ SLM array 110 and an additional detector/accumulator 109 and SLM array 110. The first detector/accumulator 109 and SLM array 110 identify each incoming customer by column and each beam by row. The optical signal out of SLM 110 is diverted by a half mirror 300 through half mirror 301, and is focused by lens 302 onto an $N \times M$ arbitrary modulator SLM array 303 (arbitrary modulator #1). This array 303 is a complex $N \times M$ array that allows for any frequency $f_1$-$Mf_1$ to modulate any pixel in the $N \times M$ array. With the arbitrary modulator #1, each pixel can be multiplied by an arbitrary $Kf_1$ that can be different for each pixel.

The reflected arbitrarily modulated signal from array 303 then is focused to a line by the first cylindrical lens 304 and is spread by the second cylindrical lens 304 through half mirror 305 to another SLM array 306 which downconverts each pixel to its $f_1$-$Mf_1$ position. The image output by array 306 then is reflected by half mirror 305 through half mirror 307 to a second $N \times M$ arbitrary modulator SLM array 308 (arbitrary modulator #2) which multiplies each pixel by an arbitrary value $Lf_1$ which is different for each pixel. The output of SLM array 308 is reflected off half mirror 307 and passed through first and second cylindrical lenses 309, 309, similarly to the handling of the output of SLM array 303. Thus each pixel is downconverted to its $f_1$ to $f_N$ position onto SLM array 311.

The first SLM array 306 effectively moves the signal in plane #1-the second SLM array 311 effectively moves the signal in plane #2, which is orthogonal to plane #1. The signal is then re-detected (as done by a detector/accumulator 109) and used to modulate another SLM array (like SLM array 110) and combined with the original signal from SLM array 110. Thus any signal from any beam can be moved to be like any other signal from any other beam, yielding a great deal more flexibility.

While the invention has been described in detail with reference to preferred embodiments, various changes and modifications within the scope and spirit of the invention will be apparent to those of working skill in this technological field. Thus, the invention is to be considered as limited only by the scope of the appended claims.

What is claimed is:

1. A two-way communication system using only one satellite, said system comprising:

receiving means for receiving a first set of N beams, each of said first set of N beams servicing M customers simultaneously, where N and M are integers;

optical channel forming means for forming a first set of N optical channels from respective ones of said N beams;

spreading means for spreading each of said first set of N optical channels in one dimension to irradiate a first $N \times M$ array;

switching means for switching a signal existing at one position of the first $N \times M$ array to any position of a second $N \times M$ array;

unspreading means for forming said second $N \times M$ array into a second set of N optical channels;

beam forming means for transforming the second set of N optical channels from said unspreading means into a second set of N beams; and transmitting means for transmitting the second set of N beams from said beam forming means, each of said second set of N beams servicing M customers simultaneously.

2. The system of claim 1 wherein said optical channel forming means includes a first $1 \times N$ spatial light modulator.

3. The system of claim 1 wherein said spreading means includes a diverging cylindrical lens.

4. The system of claim 1 wherein said switching means comprises:

channel resolving means for receiving outputs from said spreading means in $N \times M$ channels;

a cross-bar switch for receiving outputs from the channel resolving means and decoding and isolating the $N \times M$ channels; and channel modulating means for receiving outputs from said cross-bar switch and recoding the $N \times M$ channels for subsequent compression and conversion by said unspreading means and said beam forming means.

5. The system of claim 4 wherein said channel resolving means comprises:

a first $N \times M$ spatial light modulator array, receiving outputs from said spreading means;

first laser beam source means for irradiating said first $N \times M$ spatial light modulator array with a first laser beam; and a first half-mirror which is illuminated by said first laser beam.

6. The system of claim 4 wherein said cross-bar switch comprises:

an $N \times M$ detector/accumulator for receiving outputs of said channel resolving means and providing $N \times M$ outputs in isolated channels; and a second $N \times M$ spatial light modulator array having $N \times M$ elements for receiving any of the $N \times M$ outputs of said $N \times M$ detector/accumulator via any of the $N \times M$ elements and outputting them via any others of the $N \times M$ elements.

7. The system of claim 4 wherein said channel modulating means comprises:

a third $N \times M$ spatial light modulator array, receiving outputs from said cross-bar switch;

second laser beam source means for irradiating said third $N \times M$ spatial light modulator array with a second laser beam; and a second half-mirror which is illuminated by said second laser beam.

8. The system of claim 1 wherein said unspreading means includes a converging cylindrical lens.

9. The system of claim 1 wherein said beam forming means includes a second 1×N spatial light modulator.

10. The system of claim 1 further including at least one ground-based transmitter, said at least one ground-based transmitter including means for frequency coding signals of said M customers serviced by each of said N beams so as to distinguish ones of said signals pertaining to a particular one of said M customers from others of said signals pertaining to others of said M customers, wherein said spreading means spreads said signals from said M customers along separate optical paths to provide N×M frequency coded signals.

11. The system of claim 10 wherein said cross-bar switch comprises:
 a first N×M spatial light modulator array for receiving and decoding the N×M frequency coded signals from said spreading means to provide N×M decoded signals in accordance with decoding frequencies provided in said first spatial light modulator array; and
 a first N×M detector array for receiving said N×M decoded signals and isolating said N×M decoded signals into N×M respective channels.

12. The system of claim 11 wherein said cross-bar switch further comprises:
 a second N×M spatial light modulator array for receiving said N×M decoded signals in said N×M respective channels and transmitting said N×M decoded signals in any other of said N×M respective channels; and
 a third N×M spatial light modulator array for frequency modulating and recoding said N×M decoded signals in accordance with encoding frequencies provided in said third spatial light modulator array.

13. The system of claim 1 further including at least one ground-based transmitter, said at least one ground-based transmitter including means for digitally coding signals of said M customers serviced by each of said N beams so as to distinguish ones of said signals pertaining to a particular one of said M customers from others of said signals pertaining to others of said M customers.

14. The system of claim 13 Wherein said cross-bar switch comprises:
 a first N×M spatial light modulator array for receiving and decoding the N×M digitally coded signals from said spreading means to provide N×M decoded signals in accordance with decoding information provided in said first spatial light modulator array; and
 a first N×M detector array for receiving said N×M decoded signals and isolating said N×M decoded signals into N×M respective channels.

15. The system of claim 14 wherein said cross-bar switch further comprises:
 a second N×M spatial light modulator array for receiving said N×M decoded signals in said N×M respective channels and transmitting said N×M decoded signals in any other of said N×M respective channels; and a third N×M spatial light modulator array for modulating and recoding said N×M decoded signals in accordance with digital encoding information provided in said third spatial light modulator array.

16. The system of claim 1 wherein N is approximately 1000.

17. The system of claim 1 wherein M is approximately 500.

18. The system of claim 10 wherein said switching means comprises:
 a first N×M spatial light modulator array for receiving and decoding the N×M signals from said spreading means to provide N×M decoded signals in accordance with decoding information provided in said first spatial light modulator array;
 a first N×M detector array for receiving said N×M decoded signals and isolating said N×M decoded signals into a first set of N×M respective channels;
 a second N×M spatial light modulator array for receiving said N×M decoded signals in said N×M respective channels and transmitting said N×M decoded signals in any other of said first set of N×M respective channels;
 a third N×M spatial light modulator array for modulating said N×M decoded signals as N×M individual pixels;
 a fourth N×M spatial light modulator array for shifting said N×M individual pixels along a first plane;
 a fifth N×M spatial light modulator array for further modulating said N×M individual pixels to provide N×M further modified pixels;
 a sixth N×M spatial light modulator array for shifting said N×M further modified pixels along a second plane, orthogonal to said first plane, to provide N×M shifted modified pixels;
 a second N×M detector array for receiving said N×M shifted modified pixels from said sixth N×M spatial light modulator array and detecting and isolating said N×M shifted modified pixels in a further set of N×M respective channels;
 a seventh N×M spatial light modulator array for receiving said further set of N×M respective channels and transmitting any of said further set of N×M respective channels along any other of said further set of N×M respective channels; and
 an eighth N×M spatial light modulator array for modulating and recoding the decoded signals in said further set of N×M respective channels, received from said seventh N×M spatial light modulator array, in accordance with encoding information provided in said eighth spatial light modulator array.

19. The system of claim 1 further including means for rerouting signals, being transmitted from a first source to a first destination along a particular channel that is selected in accordance with a predetermined encoding scheme, via at least one intermediate destination/source pair in the event that said particular channel is occupied.

20. The system of claim 5 wherein said first N×M spatial light modulator array comprises a single N×M spatial light modulator.

21. The system of claim 5 wherein said first N×M spatial light modulator array comprises a plurality of spatial light modulators.

22. The system of claim 6 wherein said second N×M spatial light modulator array comprises a single N×M spatial light modulator, 23. The system of claim 6 wherein said second N×M spatial light modulator array comprises a plurality of spatial light modulators, 24. The system of claim 7 wherein said third N×M spatial light modulator array comprises a single N×M spatial light modulator.

25. The system of claim 7 wherein said third N×M spatial light modulator array comprises a plurality of spatial light modulators.

26. The system of claim 12 wherein each of said first through third N×M spatial light modulator arrays comprises a single N×M spatial light modulator.

27. The system of claim 12 wherein each of said first through third N×M spatial light modulator arrays comprises a plurality of spatial light modulators.

28. The system of claim 15 wherein each of said first through third N×M spatial light modulator arrays comprises a single N×M spatial light modulator.

29. The system of claim 15 wherein each of said first through third N×M spatial light modulator arrays comprises a plurality of spatial light modulators.

30. The system of claim 18 wherein each of said first through eighth N×M spatial light modulator arrays comprises a single N×M spatial light modulator.

31. The system of claim 18 wherein each of said first through eighth N×M spatial light modulator arrays comprises a plurality of spatial light modulators.

* * * * *